(12) United States Patent
Hutton et al.

(10) Patent No.: US 11,481,809 B2
(45) Date of Patent: Oct. 25, 2022

(54) INTERACTIVE SIGNAGE AND DATA GATHERING TECHNIQUES

(71) Applicants: Jay Hutton, Langley (CA); Tim Huckaby, Carlsbad, CA (US)

(72) Inventors: Jay Hutton, Langley (CA); Tim Huckaby, Carlsbad, CA (US)

( * ) Notice: Subject to any disclaimer, the term of this patent is extended or adjusted under 35 U.S.C. 154(b) by 265 days.

(21) Appl. No.: 15/731,334

(22) Filed: May 26, 2017

(65) Prior Publication Data

US 2018/0053219 A1    Feb. 22, 2018

Related U.S. Application Data

(60) Provisional application No. 62/392,439, filed on May 31, 2016.

(51) Int. Cl.
| | |
|---|---|
| *G06Q 30/02* | (2012.01) |
| *G06T 17/20* | (2006.01) |
| *G06K 9/00* | (2022.01) |
| *G06V 40/16* | (2022.01) |

(52) U.S. Cl.
CPC .......... *G06Q 30/0269* (2013.01); *G06K 9/00* (2013.01); *G06Q 30/0201* (2013.01); *G06T 17/20* (2013.01); *G06V 40/172* (2022.01); *G06V 40/173* (2022.01); *G06V 40/178* (2022.01); *G06V 40/179* (2022.01)

(58) Field of Classification Search
CPC .......... G06Q 30/0269; G06Q 30/0201; G06K 9/00288; G06K 9/00295; G06K 9/00; G06T 17/20; G06V 40/172; G06V 40/173; G06V 40/178; G06V 40/179

USPC ...................................................... 705/14.66
See application file for complete search history.

(56) References Cited

U.S. PATENT DOCUMENTS

| | | | | |
|---|---|---|---|---|
| 5,991,429 A | * | 11/1999 | Coffin ................ | G06K 9/00255 382/118 |
| 6,711,465 B2 | * | 3/2004 | Tomassi ............. | G07C 9/00087 700/236 |
| 7,174,029 B2 | * | 2/2007 | Agostinelli ........... | G06Q 30/02 382/100 |
| 7,493,190 B1 | * | 2/2009 | Tomassi ........... | G06Q 20/40145 221/13 |
| 7,921,036 B1 | * | 4/2011 | Sharma .................. | G06Q 30/02 705/14.66 |

(Continued)

FOREIGN PATENT DOCUMENTS

| | | | | |
|---|---|---|---|---|
| CA | 2891443 A1 | * | 7/2015 | ............. G07F 9/023 |
| WO | WO-2011094625 A1 | * | 8/2011 | ............. G06Q 30/02 |
| WO | WO-2013108388 A1 | * | 7/2013 | ......... G07F 17/3206 |

OTHER PUBLICATIONS

J. J. Astrain et al., Face Recognition in Biometric Vending Machines, 2004, scitepress.org, https://scitepress.org/papers/2004/13932/pdf/index.html, DOI: 10.5220/0001393202930298, pp. 293-298 (Year: 2004).*

(Continued)

*Primary Examiner* — Dipen M Patel

(57) ABSTRACT

Systems and methods employing unique optics, combined with data gathering techniques that capture user interaction in the system at the point of engagement and point of entry. This facilitates gathering real time data on users, customers or other people during engagement with elements of the system to provide analytics in real time.

6 Claims, 3 Drawing Sheets

(56) References Cited

U.S. PATENT DOCUMENTS

| | | | | |
|---|---|---|---|---|
| 8,583,511 B2* | 11/2013 | Hendrickson | G06Q 30/02 | 701/2 |
| 9,317,476 B2* | 4/2016 | Segal | G06Q 30/02 | |
| 10,235,690 B2* | 3/2019 | Saccoman | G06F 3/147 | |
| 2002/0077889 A1* | 6/2002 | Kolls | G06Q 10/10 | 705/14.51 |
| 2002/0087413 A1* | 7/2002 | Mahaffy | G10L 15/26 | 705/16 |
| 2003/0078840 A1* | 4/2003 | Strunk | G09F 27/00 | 705/14.52 |
| 2003/0088832 A1* | 5/2003 | Agostinelli | G06Q 99/00 | 715/273 |
| 2003/0126013 A1* | 7/2003 | Shand | G06Q 30/02 | 705/14.52 |
| 2007/0005524 A1* | 1/2007 | Iwachin | G06Q 30/02 | 706/15 |
| 2010/0138037 A1* | 6/2010 | Adelberg | G07F 9/001 | 700/241 |
| 2010/0262282 A1* | 10/2010 | Segal | G06Q 30/02 | 700/241 |
| 2011/0295693 A1* | 12/2011 | Clavin | H04N 21/4781 | 705/14.66 |
| 2012/0266191 A1* | 10/2012 | Abrahamsson | G06Q 30/0224 | 725/35 |
| 2013/0080222 A1* | 3/2013 | Quinn | G06Q 30/02 | 705/14.5 |
| 2013/0166372 A1* | 6/2013 | Abraham | G06Q 30/0269 | 705/14.42 |
| 2013/0215116 A1* | 8/2013 | Siddique | G06Q 20/204 | 345/420 |
| 2014/0232958 A1* | 8/2014 | Venturas | G02F 1/133308 | 349/12 |
| 2015/0269525 A1* | 9/2015 | Hazy | G06Q 10/067 | 434/237 |
| 2016/0125465 A1* | 5/2016 | Kulkarni | G06F 3/04883 | 705/14.57 |
| 2017/0083886 A1* | 3/2017 | Silva | G07F 9/001 | |

OTHER PUBLICATIONS

Japan's face-scanning vending machines, Nov. 22, 2010, THEWEEK, https://theweek.com/articles/489132/japans-facescanning-vending-machines (Year: 2010).*

Taiwan develops face-recognising vending machine, Jan. 14, 2011, phys.org, https://phys.org/news/2011-01-taiwan-face-recognising-vending-machine.html (Year: 2011).*

Vengo Vending Machines Help Brands Boost Impulse Sales, Tuesday, Dec. 9, 2014 10:07, retail TouchPoints, https://internetofbusiness.com/coca-cola-drinks-to-the-future-of-the-internet-of-things/ (Year: 2014).*

A-Nasser, Ansari & Mahoor, Mohammad & Abdel-Mottaleb, Mohamed. (2009). 3D Face Mesh Modeling for 3D Face Recognition. 10.5772/6643. (Year: 2009).*

P. Tu, R. Book, X. Liu, N. Krahnstoever, C. Adrian and P. Williams, "Automatic Face Recognition from Skeletal Remains," 2007 IEEE Conference on Computer Vision and Pattern Recognition, Minneapolis, MN, 2007, pp. 1-7, doi: 10.1109/CVPR.2007.383060. (Year: 2007).*

Astrain J., Villadangos J., Cordoba A. and Prieto M. (2004). Face Recognition in Biometric Vending Machines . In Proceedings of the First International Conference on E-Business and Telecommunication Networks—vol. 2: ICETE, ISBN 972-8865-15-5, pp. 293-298. DOI: 10.5220/0001393202930298 (Year: 2004).*

F. Alt, J. Müller and A. Schmidt, "Advertising on Public Display Networks," in Computer, vol. 45, No. 5, pp. 50-56, May 2012, doi: 10.1109/MC.2012.150. (Year: 2012).*

What is cloud computing? Apr. 7, 2016, Microsoft Azure, https://azure.microsoft.com/en-us/overview/what-is-cloud-computing/ (Year: 2016).*

* cited by examiner

INTERACTIVE SIGNAGE AND DATA GATHERING TECHNIQUES

CLAIM OF BENEFIT

This application claims the benefit of provisional patent application 62/392,439 filed on May 31, 2016 entitled INTERACTIVE SIGNAGE AND DATA GATHERING TECHNIQUES, the teachings of which are incorporated herein by reference as if specifically set forth below.

FIELD OF THE DISCLOSURE

This disclosure relates to signage for industry, and more specifically to digital signage that provides interactivity for users or customers of modalities that make use of the signage. More particularly, this disclosure relates to digital signage, and ancillary or connected machines, products, services and advertising, for example, and allows for data gathering and data reduction for all aspects of the interactivity or interactions with the signage.

BACKGROUND OF THE DISCLOSURE

For almost two decades there has been a migration of advertising spend away from broadcast media to other forms of advertising. This is largely due to the on-demand nature of television viewing which allows viewers to fast forward through advertising messages. Today, users and customers are continually inundated during their shopping and traveling experience with the myriad of products and services that are available for purchase in stores, in vending machines, and in areas such as casinos and protected environments that require secure commerce, e-commerce and other user or customer interactions with the environments. Heretofore, there has not existed in the art an integrated and coherent platform by which advertisers and sellers of the products and services can reach customers to efficiently provide their products and services, as well as to gather relevant information about the customers purchasing them. There simply has not been a way, nor have the modalities existed, to efficiently and rapidly facilitate and gather meaningful and readily usable real time data on people, for example, their identities ages, genders, ethnicities, dwell times, emotional recognition, and security threats.

Advertisers are therefore constantly looking for other ways to gain the attention of their audiences and have shifted the limited available marketing to other forms of advertising. The Internet has been the principal benefactor of this shift in recent years, not only because it has become the shopping mall of the future, but because it offers unique abilities to track consumers and develop a comprehensive database about both the general and specific buying behaviors of customers. Moreover, the focus on capturing the "out of home" shopper has also grown considerably, and the desire to grab the attention of consumers when they are not at home and, ideally, closer to a location where they might be influenced by a call to action, is increasing dramatically in attempts to capture these spending opportunities. In store advertising is attractive to advertisers that have consumer brands because their audience will receive the advertising or promotion at a location where the consumer can make a decision to purchase. This makes the advertising impression delivered at retail outlets more impactful and, therefore, more lucrative. Non-digital forms of advertising such as shelf hangers and floor mats are common in retail, but digital advertising, including signage, is not. This limits the abilities of the retailers to capture the attention of consumers in real time, and these lost opportunities result in lost sales that cannot be recaptured.

Many industries suffer from these and other lost opportunities as a result of the inadequate exploitation of digital signage, and the lack of hardware, software and other implementations that could provide a solution to this problem. For example, in the beverage and food industries, beverage, food and freezer units have transparent glass that retailers are loathe to block with advertising promotions. In order to turn this glass real estate into a lucrative platform there would have to be a technology that would allow for advertising (preferably digital) while maintaining the transparency of the platform, thereby allowing for products to be visible simultaneous to the advertising promotion. This currently does not exist in the art.

In the alcoholic beverage retail environment, for example liquor stores are continuously plagued by theft at retail. Higher end spirits and wine are particularly impacted, and the industry's response in past has been simply to lock up expensive product at the retail locations. Thus, customers wishing to purchase product behind lock up have to signal an attendant to gain access to the locked cabinet. While this is a logical way to deal with the theft problem, the unintended consequence of this tactic is that sales velocity (the rate at which product is sold at retail) is enormously and catastrophically impacted. Today, there does not exist an effective monitoring system that allows the industry to manage this problem.

Similarly, the casino industry all over the world is exploding and along with this nearly unmanageable growth, there has developed a series of challenges that casino operators have to navigate. On the regulatory side of these challenges, virtually all casino operators in the US are required to keep and maintain a "Disassociated Persons" (DAP). This DAP List is a record of all gamblers who have enrolled themselves in a program administered state by state for problem gamblers that grant the authorities the right to remove them from any casino property. If a DAP list enrollee gains access to a property only to gamble and lose money the operator is required to return the funds lost as well as face fines for not enforcing the DAP list. In addition to the regulatory threat of DAP list persons on the property, casino operators routinely face risk with respect to known criminals, banned individuals, or persons that local or federal law enforcement may be looking for. Today, casinos invest many millions of dollars in state of the art security systems that cover every inch of the property with CCTV as well as other forms of access control and security. The camera feeds are analyzed against physical photos of the individuals that the casino might be looking for and when a person of interest is observed the casino will act quickly to remove that person from the property, or take whatever actions might be necessary. The whole system has a weak link, that is, the human dependency for implementation of these measures. A security person not only has to be able to sift through multiple live video feeds but also be able to remember the pictures of what could be multiple individuals that are on the watch list. The system is prone to error and leads to enormous cost. Again, the art has not developed sufficient ways to address this problem.

In other commercial areas, for example, loyalty programs are becoming more common in various types of retail environments. These programs generally work on the concept that, upon check out, a loyalty identifier (ID) is provided and associated with the sale. The retailer is provided enormous amounts of data, including buying characteristics, brand alignment, and cross reference data points, during this process which could be enormously useful to the retailer. The primary problem with this approach is that the data is not correctly, efficiently or timely provided, and the identity or affinities of the customer is not established, until the person checks out. With no identity established until the person checks out there is no opportunity to market products or services to that person while they are in store and have the current opportunity inclination to make additional or other buying decisions.

In all of the aforementioned retail, entertainment and other public environments, the world is becoming less secure. The most dangerous spaces, at least from a terrorism point of view, are locations that are open to the public as gathering places or are general hubs of activity. Transport hubs, sports venues, shopping malls, and public squares are just a few examples of locations that represent risk to the general public and opportunity for terrorists. There is an enormous public dialogue about how to make these locations more secure while still allowing freedom of assembly and movement. CCTV networks are a critical part of the solution but have serious restrictions. As mentioned above, CCTV camera networks and systems involve human dependency issues as well as an angle of attack issue. The former relates to the fact that human beings must monitor video feedback from many different cameras, and the latter is a result of the positioning of many of these cameras in high postings that may be looking down on people and, therefore, unable to clearly observe and record their faces. A solution that would augment CCTV and provide a more scale-able way to scan crowds is desperately required.

These and other issues and problems have not heretofore been addressed or solved in the art.

SUMMARY

The aforementioned problems are solved, and long-felt needs met, by the present principles by the provision of a system employing unique optics, combined with data gathering techniques that capture user interaction in the system at the point of engagement and point of entry. This facilitates gathering real time data on users, customers or other people during engagement with elements of the system to provide analytics in real time.

BRIEF DESCRIPTION OF THE DRAWINGS

The proposed method and apparatus is best understood from the following detailed description when read in conjunction with the accompanying drawings. The drawings include the following figures briefly described below.

Figure 1:
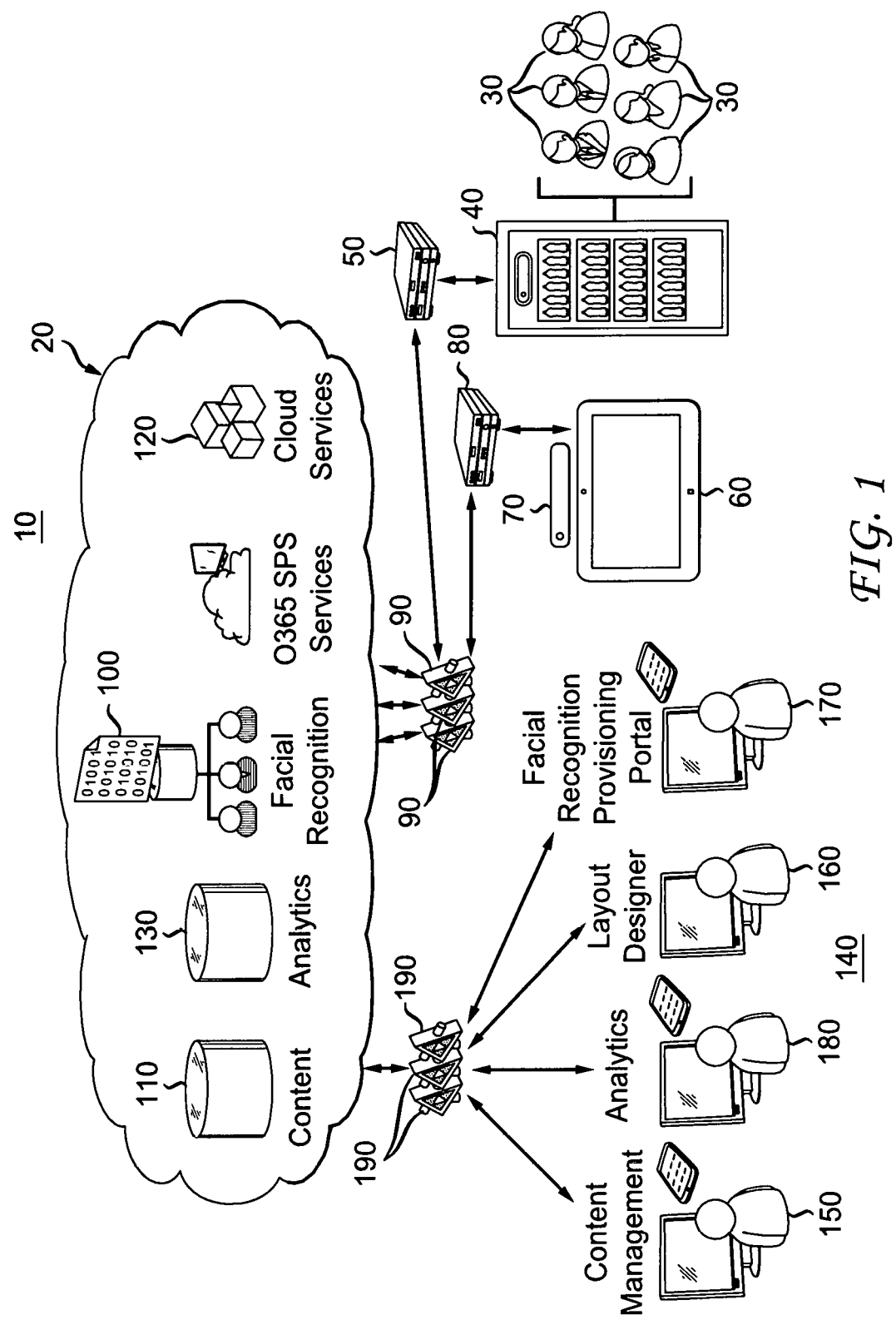
FIG. 1 shows an exemplary architecture of a system for implementing product sales from interactive vending machines employing the present principles.

It should be understood that the drawing(s) are for purposes of illustrating the concepts of the disclosure and is not necessarily the only possible configuration for illustrating the disclosure.

DETAILED DESCRIPTION OF EMBODIMENTS

The present description illustrates the principles of the present disclosure. It will thus be appreciated that those skilled in the art will be able to devise various arrangements that, although not explicitly described or shown herein, embody the principles of the disclosure and are included within its scope.

All examples and conditional language recited herein are intended for educational purposes to aid the reader in understanding the principles of the disclosure and the concepts contributed by the inventor(s) to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared.

Moreover, explicit use of the term "processor" or "controller" should not be construed to refer exclusively to hardware capable of executing software, and may implicitly include, without limitation, digital signal processor (DSP) hardware, read only memory (ROM) for storing software, random access memory (RAM), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

Any element expressed, or which ultimately might be construed, as a means or step for performing a specified function is intended to encompass any way of performing that function including, for example, a) a combination of circuit elements that performs that function or b) software in any form, including, firmware, microcode or the like, combined with appropriate circuitry for executing that software to perform the function. It is intended that the functionalities provided by the various recited elements will combined and brought together in a manner understood by those skilled in the art, and by any means or steps that can provide those functionalities, and their equivalents.

Referring to FIG. 1, an exemplary system architecture 10 of this disclosure implements a cloud-based analytical environment 20 that allows users, customers of other people 30 (hereinafter referred to as "users") to interact with a vending machine 40, for example, so that ultimately the users 30 can purchase products from the vending machine 40. It will be appreciated that other products, or indeed services, could be sold to users 30 from machine 40. It will also be appreciated that while the analytical environment 20 is shown as being cloud-based, this environment could also be implemented in a self-contained network such as a LAN, WAN or through elements of the Internet in combination with the Internet, the cloud or other elements of a computer-based network.

Vending machine 40 is equipped with the appropriate modality to interact with the Internet, either through a wireless connection 50 or through an Ethernet or equivalent type of communication bus. Other communications devices, for example a screen, television, or other type of display device 60 and a camera 70, may also be used to allow users 30 to interact in the system 10, and are also able to communicate through a wireless device 80 or other communication bus. The screen or television 60 and camera 70 allow user profiles, to be described in more detail below, to be gathered and processed as the user engages in the shopping and purchasing process, and further facilitates data gathering opportunities for the system 10. The users may optionally be given access to a variety of apps 90 which also facilitate and allow interaction in the system 10 with the cloud-based environment 20.

In accordance with some of the principles of the disclosure, and as mentioned above, the architecture of FIG. 1 provides solutions to the problems in the art regarding identifying and seeing people interacting within range of the vending machine 40, camera 70, which for example could be a 3D camera, or with other particular devices in the environment of architecture 10. The system thereby provides, for example, demographic tracking of users' age, race, gender, and other salient demographic data. Facial Identification is provided which will allow the system to identify users that have appeared before, or interacted with, as well as facial recognition wherein the user opts-in to be recognized by the system.

More subjective data points may be quantified by the system architecture of FIG. 1, for example, the emotional satisfaction of a user which may be tracked during interaction with the system to determine whether the user is happy when viewing an ad or content. Engagement tracking, that is whether a user's eyes are engaged with the content or looking away may be tracked, and the number of viewers and the level of engagement that they have with the platform may be quantified. More simple analytics may be gathered, for example, the counting of people that come in "site" of the system, which in and of itself is a very useful set of data that may be provided to vendors or advertisers, for example. By providing the ability to gather the above mentioned data, and indeed other types of date, the system of the present disclosure provides an efficient and cost-effective tool to develop targeted content or advertising based on any of the tracking categories delineated herein.

In a preferred aspect of the disclosure, the Microsoft Azure™ (trademark owned by the Microsoft Corporation of Redmond, Wash.) is used to implement the cloud architecture 20. Within the cloud 20, the principles of the disclosure provide for facial recognition processing and data reduction 100, and the modality to implement content 110 so that a designer of a custom system of the present principles can provide both interactive and non-interactive content groups. This may allow for sophisticated multi-screen spanning, which will allow the content and touch to span unlimited large form factor screen devices 60. Moreover, it is possible to tracks at least six users at a time during facial recognition 100 to measure their engagement, emotion, demographic profile (age, race, gender, etc.) as they interact with the system. Additionally, the system 10 is provided with cloud services 120 that contains the necessary components and data infrastructure to gather and persist demographic and usage data into the cloud databases that will store the data, and store the analytically reduced parameters that may be acquired from the data according to the particular needs of the advertiser or vendor, for example.

As will be further appreciated, the system design provides the necessary engineered solutions for an analytics module 130 to engage in fault tolerant and properly scaled local services that are ultimately engaged in the cloud services module 120. This will allow for synchronized content of the end devices, and the proper gathering of analytics from these endpoints by the analytics module 130. This will also allow for the performance of proper facial recognitions and demographic profiles in real time. To ensure a secure web portal and safe content management system and reporting, the architecture 20 is preferably hosted on a Microsoft Office 365 SharePoint™ (trademark also owned the Microsoft Corporation of Redmond, Wash. host server). The architecture advantageously allows campaign and day-parting of advertising based on demographic profile.

In order to properly interface with the cloud 20 and design customized systems to satisfy the needs of any advertiser, vendor or entity that requires the data gathering capabilities and analytics of the present disclosure, a backend portion 140 is provided to allow for system design. Backend portion 140 radically alters the prior methodology and delivery modality of legacy systems while capturing demographic and consumer behavior in the finest detail. Backend portion 140 addresses many important and salient design and feature objectives. Backend portion 140 is essentially a "what you see if what you get" (WYSIWYG) screen layout editor that provides flexibility in design and ease of use for custom application of system 10.

For example, the software which is used to implement backend portion 140 is optimized for low cost, generic computing platforms, and may utilize commercial off the shelf systems, for example low cost Windows™ (trademark owned by the Microsoft Corporation of Redmond, Wash.) embedded operating systems. Thus, the software use is oriented around "touch" and/or "gesture" and/or "voice recognition" interfaces, and provides for management of all types of digital assets, web content, structured data, and virtual objects in both 3D and 2D. The software can content manage data, assets and images from foreign systems, and is flexible in terms of size and interactive regions to display content.

Moreover, the software is multi-platform and is able to be displayed on mobile or large form factor screens or even run "headless" in facial recognition modalities. Additionally, the software leverages the cloud infrastructure 20 for hosting of centralized digital assets with fault tolerant and scalable cloud services that syntonizer content to local devices, as mentioned above. This allows for simple, scalable and wide spread content updates across multiple platform locations and end points. As discussed above, the backend platform 140 also provides for a sophisticated content management system 150 design function and a layout designer 160 function as a service or as a self-service, for example. A facial recognition portal 170 allows the designer to interact with facial recognition analytical functions 100 in the cloud 20, and an interactive analytics functions 180 also is interfacable with the cloud 20. As will be appreciated, a secondary series of apps 190 may also be accessible by operators in the backend platform to interface as is desired with functional aspects of the features of the architecture 10 in the cloud 20.

The software running the backend platform 140 may be built and presented in Windows Presentation Foundation (WPF), which is a graphical subsystem for rendering user interfaces in Windows-based applications. WPF, previously known as "Avalon", was initially released as part of .NET Framework 3.0. WPF uses DirectX for vector based graphics and other advanced graphical capabilities. WPF employs XAML, an XML-based language, to define and link various interface elements. WPF unifies a number of common user interface elements, such as 2D/3D rendering, fixed and adaptive documents, typography, vector graphics, runtime animation, and pre-rendered media. These elements can then be linked and manipulated based on various events, user interactions, and data bindings. WPF runtime libraries are included with all versions of Microsoft Windows since the advent Windows Vista™ (trademark of the Microsoft Corporation of Redmond, Wash.) and Windows Server 2008™ (trademark of the Microsoft Corporation of Redmond, Wash.).

With the system architecture of FIG. 1, a completely flexible, interactive digital signage environment is achieved. Demographic profile options preferably use a 3D camera 70 to produce profiles based on age, gender and ethnicity. This demographic profile data is persisted in cloud databases 120 for analytics reporting. Dwell time and emotion recognition is also captured. Other features include campaigns based on day-parting. Custom content 110 based on a demographic profiles may also be persisted and displayed, and, the connection between public engagement and analytics, happen in real time. Preferably, facial recognition to handle both loyalty programs and security scenarios is also achievable. Additionally, the present architecture 10 allows running of a security embodiment "headless", that is, no large form factor screen is used for running interactive digital signage. In this embodiment, the includes 3D camera 70 for facial recognitions with speed, accuracy and scale. Advantageously, the system may be used by independent custom developers to enhance and extend, the system with custom software for purpose built applications, and may be implemented with content management system self-management capabilities for customers that desire a self-serve function. Additionally, a software as a service (SaaS) context may be implemented in accordance with the principles of the disclosure, which may include hosting for a monthly fee.

Those with skill in the art will therefore appreciate that systems designed in accordance with the principles of the present disclosure can gather data never before captured at the point of engagement or point of entry. This facilitates real time gathering of data on the user, for example their identity, age, gender, ethnicity, dwell time, emotion recognition, and security threat. Coupled with the use of advanced optical displays to be described in more detail below, the connection between public engagement and analytics happens in real time. These results have not heretofore been achieved in the art, and provide solutions to the long-felt and unfulfilled needs which exist with current data gathering systems today.

As mentioned above, advanced optical displays are integrated into the system of FIG. 1, and may be placed on, for example, the vending machine 40 to implement the data gathering and tracking features of the disclosure. Such optical displays are known in the art, and use advanced optical bonding techniques. An example of such an optical bonding technique to produce advanced displays is illustrated in U.S. Pat. No. 6,961,108 Wang ET al., the teachings of which are specifically incorporated herein by reference. Other, more recent examples of LCD displays incorporating advanced optical bonding techniques are found in U.S. Pat. No. 8,462,301 O'Donnell, the teachings of which are also specifically incorporated herein by reference.

Figure 2A:
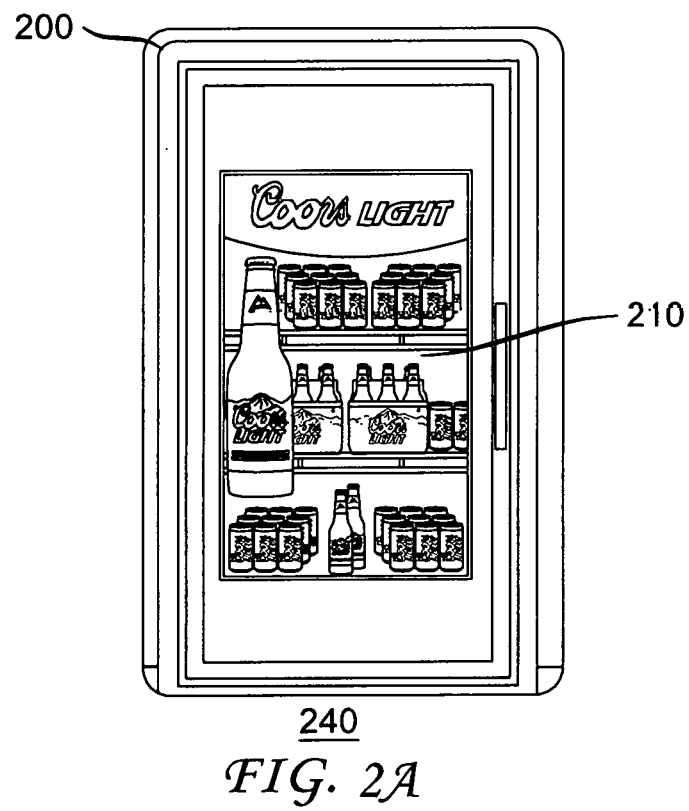
FIGS. 2A and 2B are schematic views of a vending machine of the present principles which employ transparent LCD layers and touch screens.
Figure 2B:
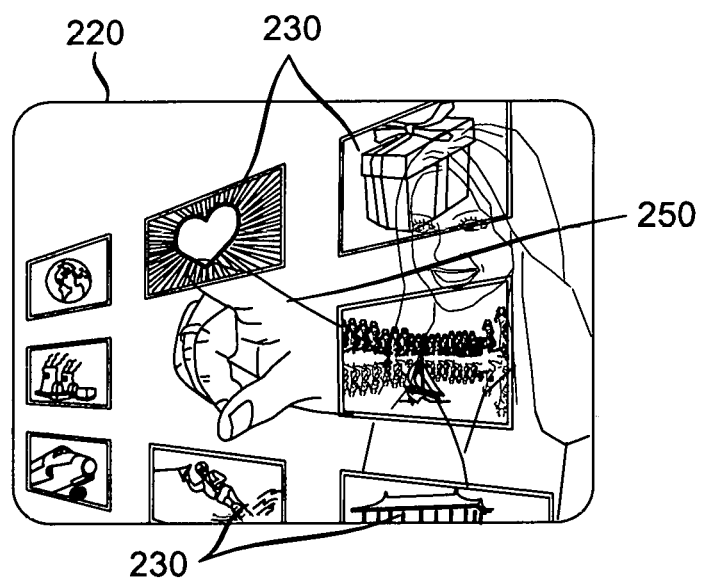

Referring to FIGS. 2A and 2B, an exemplary vending machine 240 (shown particularly in FIG. 2A), is illustrated and which may be used in the system of FIG. 1 as a replacement for, or in addition to, vending machine 40. Machine 240 has a conventional cabinet 200, in which a freezer unit, refrigerated unit, or other vending unit (not shown) is housed, and from which products or services may be vended. As has been described above, users of the machine will, in the normal course of the machine's placement in an area, public or otherwise, traverse in and around machine 240 and may wish at some point to purchase products or services from machine 240. It would be desirable to employ a function within or around machine 240 to attract the users' attention to the machine, its products or services, to entice the users to purchase the products or services In order to entice the users to the machine 240, attached thereto is an LCD panel 210 which is transparent, and which can have displayed thereon advertisements which are attractive, evocative, and which can draw users to the machine to advertise the machine's products or services. Such advertisements may be animated, computer-generated, and/or interactive. Moreover, the LCD panels 210 may further contain interactive touch screens 220 (shown particularly in FIG. 2B), either as part of the LCD panel 210, as portions thereof, or as separate LCD screens also appended, attached or otherwise associated with machine 240. The touch sensitive panels 220 may themselves contain one or more touch sensitive icons 230 which may be interactive with the user by touching icons 230, as shown generally at 250.

Several hardware suppliers introduced transparent LCD screens in various sizes which can be used to implement vending machine 240 with touch sensitive LCD panel 210 and touch screen 220. One such supplier is the OPTIKA Display Solutions Company of Los Angeles, Calif. This technology allows for the placement of a HD capable video screen in the form factor of a door. This technology, with adjustable transparency, has delivered digital capabilities to cooler and freezer doors and provided ways whereby promotions can be delivered in store to captive audiences. With the integration of the software CMS solution of FIG. 1, and the vending machine 240, high impact visual capabilities may be delivered directly to an in store consumer.

Thus, the present disclosure implements principles that extend beyond basic digital signage and include HD quality video (the ability to play multiple videos simultaneously), adjustable opacity (in order to modify transparency based on the nature of the content) touch screen integration, which is a software solution that allows for the creation of unique interactive content, day parting, which is the ability to change the entire content set on a time of day basis, and camera integration, which is the ability to have an integrated camera designed to play content that is meant to entice consumers to approach and interact with the content.

In conjunction with these important features and advantages, the system 10 and vending machine 240 also allow for extensive reporting that includes proof of play reporting (to demonstrate to an advertiser that their advertising has played, and how many times it has played), demographic triggering, which is the ability to play content based upon what the camera sees (age, gender, etc.), and in store reporting including multiple criteria of reporting, key relate elements of which include, for example, Total Brand Impressions, Total Brand Engagements, Total Interactions, the number and identity of unique visitors, the number and identity of returning visitors, the dwell time of visitors, and the race gender, age and emotional engagement of the visitors.

A primary application of system 10 and vending machine 40, 240 is the delivery of a digital signage to a location and within a context where none before existed, and to make that medium a compelling way to deliver promotions and information to consumers and users. This helps consumer packaged goods companies deliver a "brand experience" to a location where a consumer or user is in a position to act on that message. The system of FIG. 1 leverages camera technology to gather meaningful information in real time from the point of sale. This data collected not only provides the advertisers the ability to measure campaign effectiveness, but the brand can get invaluable insights as to the nature of their consumers and users, including buying behavior, demographics, and never before seen consumer data; all in real time. No prior systems combine digital signage with data collection. The systems employing the present principles provide the ability to deliver key messaging at point of sale, which is critical to the value equation. Such results have not been heretofore achieved in the art.

Figure 3:
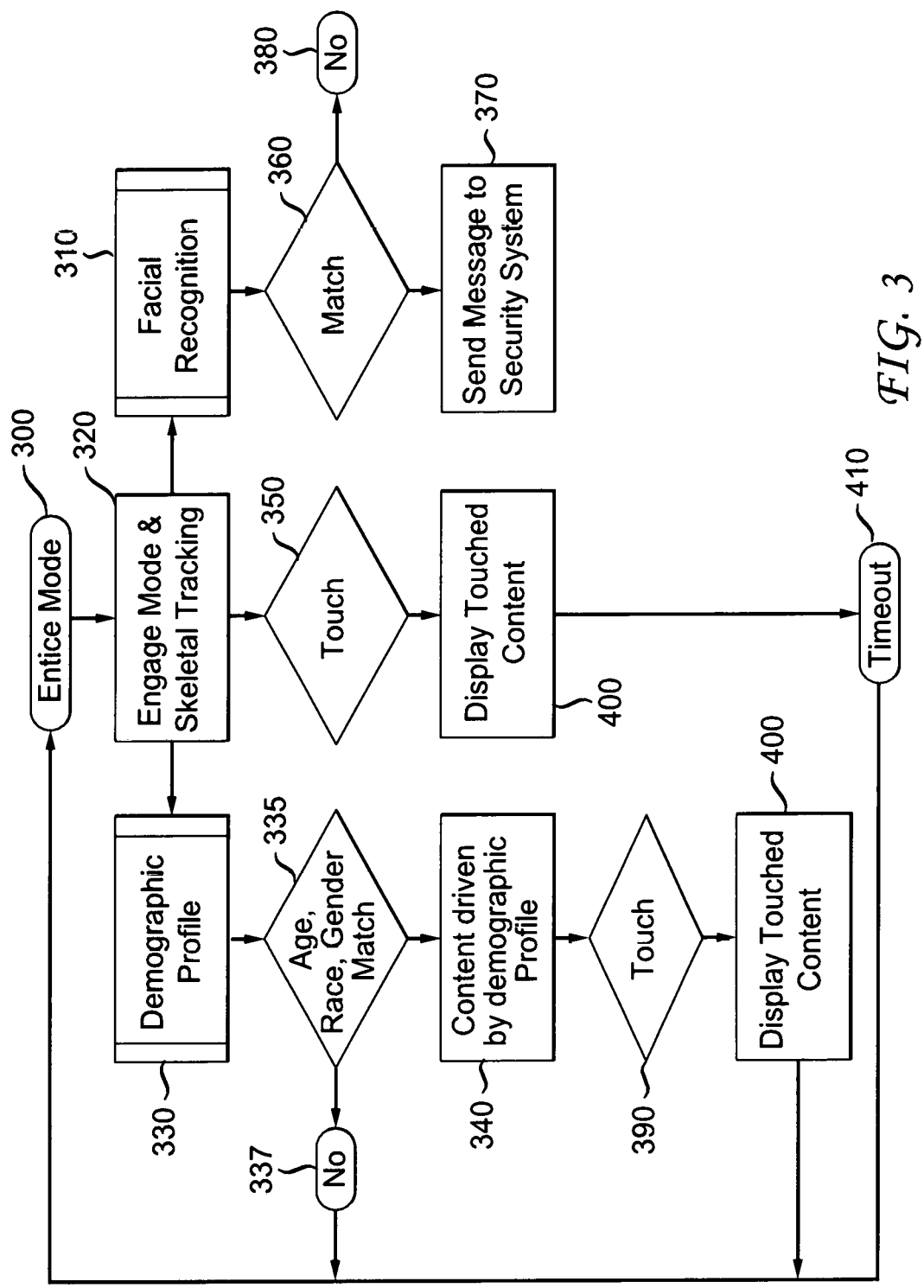
FIG. 3 is an exemplary flow chart of a mode for enticing individuals to engage a system and to allow for data gathering and data analytics employing the present principles.

Referring to FIG. 3, a flow chart illustrating the present data gathering and analytical principles is illustrated. These principles utilize the vending machine 240 as described, but are equally usable in other applications for other uses of the touch sensitive, transparent LCD panels discussed above. Entice Mode 300 is an engaging and eye catching content delivery function that runs until the 3D camera 70 identifies one to many users that are interacting with the system 10. The 3D camera 70 does a skeletal map of the person(s) to determine the Facial Recognition 310 of the persons, and then the system switches into Engage Mode and Skeletal Tracking 320. Once skeletal tracking identifies the faces camera 70 identifies, the system rapid fires pictures of the faces (even while the people are moving) to the cloud API. The pictures are decomposed into a physics mesh and thrown away. The algorithms are run on the meshes for facial recognition and to produce Demographic Profile 330.

If the demographic profile matches the targeted demographic by age, race, gender, etc. 335, then the standard campaign driven content is swapped out for custom content based on the demographic profile 340. If not at 337, then the system reverts to Entice Mode 300. However, if the user touches the transparent glass 350 after having been matched, then the Interact mode is triggered switching out from Engage Mode 320. If the Facial Recognition 310 engine produces a match 360 the alerts are sent to the security system(s) 370, otherwise no match of the user is found 380.

Then, if the demographically profiled user engages in the content by touching 390 the transparent glass then Interact mode is triggered, switching out from Engage Mode 320 providing custom content 400 to the demographically targeted user. After the user walks away, the system reverts back into Entice Mode where the process starts all over again. If no action is resolved by the system 10, then the systems may timeout 410, and revert to Entice Mode to start again.

It will be appreciated that other retail and public environments suffer the data gathering, tracking and analytics problems that the present principles address and solve. For example, higher end liquor, both wine and spirits, are often displayed at retail in custom point of purchase display constructions. In many cases brands will create custom display cases in order to help their product stand out and to provide a luxury brand impression in store. In accordance with the present principles, both displays and cameras can be added to these points of purchase display units to capture information on individuals accessing the unit that is now unlocked and accessible to any and all customers. The technology can be equipped to capture a photo when a customer approaches, when a customer accesses, or when a customer grabs a product. A message, along with a photo, can be instantly and securely provided to a designated person or persons at retail. Gathering this information acts as a theft deterrent, particularly since it provides a surveillance element that is "in context" directly at retail. But, in addition to the core application, it also provides brands with instant and continuous in store data. This solution can be sold in conjunction with digital signage and display (a point of purchase display with a LCD screen providing brand information) or simply as a camera solution not necessarily tethered to display.

Machine learning has advanced enormously in the past few decades. The same basic technology that allows a car to drive itself is responsible for ancillary development in unrelated technology arenas. Machines are now capable of interpreting data not just recording and analyzing data. The present principles will allow casino operators to deploy additional camera technology at eye level (ideally in conjunction with digital signage) to pro-actively scan crowds of people for persons that have been entered into the "watch list". This application, coupled with machine learning capabilities now being developed, will provide the casino operator with abilities to track and safeguard their casinos. Unlike other forms of facial recognition technology, the present principles can track people while they are moving though public spaces. Prior imaging techniques require persons to stand at a kiosk while their image is captured and compared. This approach to casino security is awkward, and cannot provide the required unobtrusive tracking that is required in the casino environment to allow the casino to run smoothly, without disruption. The present architecture allows for scanning a crowd looking for bodies (separating bodies from objects) and discerns where the face is on a given body. Once the face is captured the facial recognition lookup can occur. This all happens in milliseconds and allows the system to scan large crowds of people in real time.

The present system uniquely merges of a security application with a digital signage application in a manner that enhances both applications. A facial recognition application that merely scans the crowd has a certain value but, when added to digital signage, the solution becomes even more compelling. The digital signage content is created to draw the attention of the audience. A facial recognition application that is designed to draw attention (by applying a creative treatment to the digital signage) will, by definition, be more effective as people are more likely to look directly at the signage (thereby increasing efficiency and accuracy).

The current principles are well applicable to integrating emotional detection into a software solution. In addition to detecting such emotional responses like smiling, frowning, the present architecture will bring great advances in being able to sense a person who is exhibiting visual cues of stress is the promise of this technology, which has not been possible in the past.

The present principles may also be extended to the application of plucking faces from real time video. This means that the multiple video feeds that today are gathered and delivered in real time can be filtered through the present processes that will, in real time, pluck individuals out of crowds to provide alerts on possible restricted or sought after individuals. Such an application will be usable to analyze video from one or many legacy or existing sources.

It can be said that with facial recognition a person's face is his or her identity. Based upon a consent and opt-in process, individuals wishing to be offered promotions at point of sales can do so. The present platform can identify an individual to offer on the spot promotions with full knowledge of that specific customer's buying preferences. The customer relinquishes anonymity but receives discounts and offers in return. The result is that loyalty/identity is determined prior to check out. This makes driving context and campaigns that are valuable to the customer a possibility.

When cameras are placed in conjunction with digital signage critical objectives may be achieved. For example, compelling content displayed on digital signage will draw the eyes of the audience, which is highly important in achieving the desired recognition that the owner of the signage wants to accomplish. This drastically increases the number of people that look at the signage, even if only for a brief time. Another critical objective is achieved since the angle of attack is vastly superior with the camera being co-located with the signage. Both of these factors, taken together, increase the accuracy and the hit rate of the present systems in crowd scanning technology. While it is desirable to get a clean frontal face view, the present architecture need only acquire a portion of the face to determine an accurate match. A probability score is provided with each match, which allows an appropriate response to be actioned. Assuming good camera placement (in areas where traffic flow is constricted to a specific and defined path) the present system can scan hundreds of individuals very efficiently. This leverages a highly scalable local or cloud based database that is populated with basic biometric data of known persons.

It is to be understood that the proposed method and apparatus may be implemented in various forms of hardware, software, firmware, special purpose processors, or a combination thereof. Special purpose processors may include application specific integrated circuits (ASICs), reduced instruction set computers (RISCs) and/or field programmable gate arrays (FPGAs). Preferably, the proposed method and apparatus is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It should be understood that the elements shown in the figures may be implemented in various forms of hardware, software or combinations thereof. Preferably, these elements are implemented in a combination of hardware and software on one or more appropriately programmed general-purpose devices, which may include a processor, memory and input/output interfaces. Herein, the phrase "coupled" is defined to mean directly connected to or indirectly connected with through one or more intermediate components. Such intermediate components may include both hardware and software based components.

It is to be further understood that, because some of the constituent system components and method steps depicted in the accompanying figures are preferably implemented in software, the actual connections between the system components (or the process steps) may differ depending upon the manner in which the proposed method and apparatus is programmed. Given the teachings herein, one of ordinary skill in the related art will be able to contemplate these and similar implementations or configurations of the proposed method and apparatus.

What is claimed is:

1. A system that implements data gathering and analytics for delivery of custom content to a demographically targeted first user on a digital sign associated with a vending machine which is displaying standard content to users to entice users to interact with the vending machine, and for an entity requiring the data gathering and analytics, the demographically targeted first user having a targeted demographic profile comprising:

the vending machine which further comprises;
    a cabinet in which a vending unit is housed and from which products or services are purchased by the user,
    a digital sign comprising an LCD panel attached to the cabinet and which can display content which can entice the first user to the vending machine,
    an interactive touchscreen associated with the LCD panel adapted to display interactive icons that allow the first user to interact with the vending machine, and
    wherein the LCD panel has adjustable opacity thereby allowing the vending machine to modify transparency of the LCD panel;

a cloud-based network server in communication with the vending machine having a memory which stores the standard content and a processor configured to deliver the standard content to the digital sign for viewing by the first user so that the standard content will entice the first user to engage the system and so that the first user can be visually tracked;

a camera associated with the vending machine for visually tracking the first user and that identifies the first user interacting with the vending machine and does a skeletal map of the first user as the first user is engaged to interact with the system by viewing the standard content being displayed on the digital sign and to determine facial recognition of the first user's face;

an Internet communications bus which allows an application programming interface to communicate a picture of the first user's face to a memory in the system for storing the picture;

an application which will allow the first user of the vending machine to communicate with the system through the Internet;

a facial recognition and data reduction module comprising an opt-in function, wherein the first user opts in to allow facial recognition of the first user by the system;

the facial recognition and data reduction module in the cloud-based network server for decomposing the pictures of the first user's face from the skeletal map into a mesh of features and storing the mesh of features for the first user, thereby determining facial recognition data of the first user and identifying the first user, and determining a demographic profile of the first user, the determined demographic profile of the first user based on the mesh of features and wherein the demographic profile of the first user comprises a group consisting of age, race, gender, engagement, emotional state, security threat, buying characteristics and buying decisions of the user, and wherein engagement tracking is performed by determining whether the first user's eyes are engaged with the custom content and counting users that come in site of the system;

a database in the cloud-based network server for storing in the cloud-based network server the facial recognition data of the first user gathered during the enticement of the first user to engage the system;

a backend platform in communication with the facial recognition and data reduction module for providing content management and provisioning to satisfy particular data gathering and analytics required by the entity by performing further analysis of the facial recognition data stored in the database, wherein the content management and the provisioning of the interactive and non-interactive content groups is performed by, (a) determining that the determined demographic profile of the first user matches the targeted demographic profile of the first user and swapping out the standard content for the custom content based on the determined demographic profile of the first user, (b) triggering an interact mode after the first user has been matched and touched the transparent glass, (c) when the determined demographic profile does not match the targeted demographic profile, reverting the system to further entice another user to engage the system after the first user ceases engaging the system, wherein the determined demographic profile is persisted in real-time to allow for analytics reporting of the determined demographic profile, and (d) providing the custom content to the vending machine when the demographically profiled user has engaged the standard content by touching the transparent glass and;

a cloud services database in the cloud-based network server for reporting to the entity a security threat when it has been determined by facial recognition that the first user identity matches a security threat and sending a security alert from the cloud-based server to a security system associated with the entity and to report to the entity a unique identity of the first user and the security threat of the first user.

2. The system recited in claim 1, wherein reverting comprises one of enticing another user to engage the system when the first user has walked away from the vending machine or timing out the system.

3. The system recited in claim 2, wherein the touchscreen comprises portions that are interactive.

4. The system recited in claim 3, wherein, the touchscreen comprises a plurality of touch sensitive icons.

5. The system recited in claim 4, wherein the database further stores data about the first user relating to how many times the first user has engaged the vending machine.

6. The system recited in claim 5, further comprising a reporting module for reporting how many times the advertiser's advertising has been played, how many demographic triggering events have occurred, identity of unique users to the vending machine, number and identity of returning users to the vending machine, dwell time of users to the vending machine, and race, gender, age and emotional engagement of users with the content on the vending machine.

* * * * *